US010830704B2

(12) United States Patent
Chen et al.

(10) Patent No.: US 10,830,704 B2
(45) Date of Patent: Nov. 10, 2020

(54) FRAME LAYER RECEIVING A SUBSTRATE SUPPORTED SEL STAGE (71) Applicant: Hewlett-Packard Development Company, L.P., Houston, TX (US)

(72) Inventors: Chien-Hua Chen, Corvallis, OR (US); Michael W. Cumbie, Corvallis, OR (US); Devin A. Mourey, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 4 days.

(21) Appl. No.: 16/097,922

(22) PCT Filed: Jul. 15, 2016

(86) PCT No.: PCT/US2016/042570
§ 371 (c)(1),
(2) Date: Oct. 31, 2018

(87) PCT Pub. No.: WO2018/013137
PCT Pub. Date: Jan. 18, 2018

(65) Prior Publication Data
US 2019/0145896 A1 May 16, 2019

(51) Int. Cl.
*G01N 21/65* (2006.01)
*G01N 21/64* (2006.01)
*G01J 3/44* (2006.01)

(52) U.S. Cl.
CPC .......... *G01N 21/658* (2013.01); *G01J 3/4406* (2013.01); *G01N 21/64* (2013.01); *G01N 2021/651* (2013.01)

(58) Field of Classification Search
CPC ................ G01N 21/658; G01N 21/64; G01N 2021/651; G01J 3/4406
See application file for complete search history.

(56) References Cited

U.S. PATENT DOCUMENTS

| 3,949,505 | A | * | 4/1976 | Kato ...................... G03B 21/64 40/706 |
| 7,511,808 | B2 | | 3/2009 | Tong et al. |
| 2007/0254377 | A1 | * | 11/2007 | Li ........................ G01N 21/658 436/171 |
| 2008/0094621 | A1 | | 4/2008 | Li et al. |
| 2011/0294691 | A1 | * | 12/2011 | Erickson ............. B01F 13/0076 506/9 |

(Continued)

FOREIGN PATENT DOCUMENTS

| CN | 103293142 | 9/2013 |
| WO | WO-2014188237 | 11/2014 |

OTHER PUBLICATIONS

Etched Lead Frames for Semiconductor, Photofabrication Engineering, Inc., Available on the Internet: http://www.photofabrication.com/division-specialties/lead-frame-division/etched-lead-frames-for-semiconductors (retrieved on May 2, 2016).

(Continued)

*Primary Examiner* — Jamil Ahmed
(74) *Attorney, Agent, or Firm* — Rathe Lindenbaum LLP (57) ABSTRACT

An apparatus may include a frame layer having a recess, a substrate secured to the frame layer at least partially across the recess and a surface enhanced luminescence (SEL) stage supported by the substrate within the recess.

16 Claims, 5 Drawing Sheets

(56) References Cited

U.S. PATENT DOCUMENTS

| | | |
|---|---|---|
| 2014/0125976 A1 | 5/2014 | Kim et al. |
| 2014/0218727 A1 | 8/2014 | Li et al. |
| 2015/0065390 A1 | 3/2015 | Bratkovski |
| 2015/0077744 A1 | 3/2015 | Smirnov et al. |
| 2015/0204792 A1 | 7/2015 | Shibayama et al. |
| 2016/0054227 A1 | 2/2016 | Ito et al. |
| 2016/0103074 A1 | 4/2016 | Gibson et al. |
| 2016/0312165 A1* | 10/2016 | Lowe, Jr. ............... C12M 29/10 |

OTHER PUBLICATIONS

Hu Min, et al; Gold Nanofingers for Molecule Trapping and Detection; JACS Communications; American Chemical Society; pp. 12820-12822.

* cited by examiner

FRAME LAYER RECEIVING A SUBSTRATE SUPPORTED SEL STAGE

BACKGROUND

Surface-enhanced luminescence (SEL) techniques, such as surface-enhanced Raman spectroscopy (SERS), are sometimes used for analyzing the structure of inorganic materials and complex organic molecules. SEL techniques focus electromagnetic radiation or light onto an analyte supported by a stage, wherein the radiation scattered or reflected by the analyte is detected for analysis.

BRIEF DESCRIPTION OF THE DRAWINGS

FIG. 12A is a sectional view illustrating the securement of the example ceiling layer to the example frame layer.

DETAILED DESCRIPTION OF EXAMPLES

Surface-enhanced luminescence (SEL) may be used for analyzing the structure of inorganic materials and complex organic molecules. SEL focuses electromagnetic radiation or light onto an analyte supported by a stage, wherein the radiation scattered or reflected by the analyte is detected for analysis. The stage provides an analyte supporting surface that enhances the analyte response to provide enhanced sensitivity.

The present disclosure describes a simple and low cost SEL stage package. The package comprises a frame layer having a recess, wherein a substrate supporting a SEL stage is secured to the frame layer at least partially across the recess with the SEL stage within the recess. The frame layer cooperates with the substrate to form a well about the SEL stage for packaging the SEL stage and for containing fluid being tested. The package formed from the frame layer facilitates independent fabrication of the SEL stage upon the substrate, with the substrate and the SEL sensor being simply subsequently mounted in the frame layer. As a separate component from the substrate and SEL stage, the frame layer is more easily fabricated at a lower cost.

Figure 1:
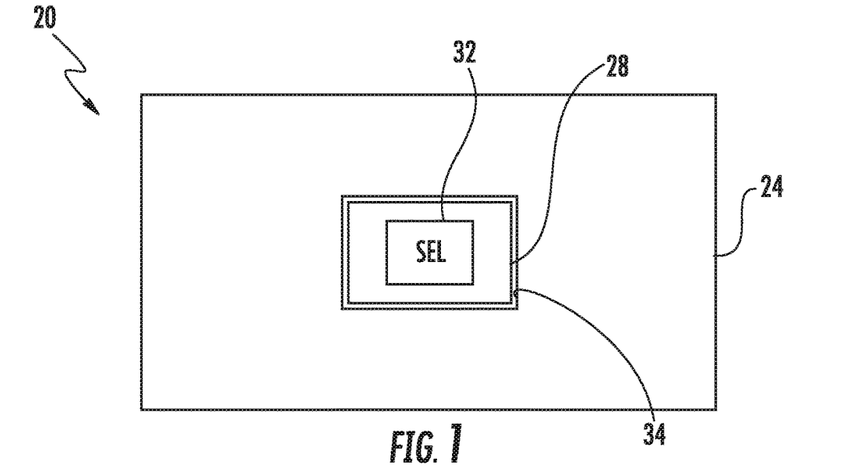
FIG. 1 is a top view schematically illustrating an example SEL stage package.

FIG. 1 is a top view schematically illustrating an example SEL stage package 20 for use as part of a SEL sensing system. Package 20 comprises frame layer 24, substrate 28 and SEL stage 32. Frame layer 24 surrounds and protects substrate 28 and SEL stage 32. Frame layer 24 forms a recess 34 in which at least SEL stage 32 is supported. Frame layer 24 facilitates separate and independent fabrication and/or assembly of substrate 28 and SEL stage 32, wherein substrate 28 may be subsequently mounted or secured to frame layer 24 with SEL stage 32 within recess 34. Recess 34 not only surrounds substrate 28 and SEL stage 32, but may also serve as a reservoir for containing the solution and analyte being tested in contact with SEL stage 32. Although recess 34 is illustrated as being rectangular, recess 34 may have a variety of other shapes and proportions.

Substrate 28 comprises a layer or platform supporting SEL stage 32. In one implementation, substrate 28 is formed from a sufficiently flexible material or a group of flexible materials so as to facilitate the fabrication of SEL stage 32 upon substrate 28 in a roll-to roll process. In other implementations, substrate 28 is stiff. In one implementation, substrate 28 may be formed from materials including, but not limited to, silicon, glass, ceramic, copper, metal alloy, Kapton (a HN polyimide film with silicon adhesive, commercially available from Dupont), Uplix (a type of polyimide), Epoxy (polyepoxides), Mylar (a polyethylene terephthalate, PET material), or other polymer materials.

As will be described in detail hereafter, in some implementations, substrate 28 is mounted to frame layer 24 outside of recess 34. For example, in one implementation, substrate 28 may be mounted to a face of frame layer 24 while extending completely across recess 34 and while supporting SEL stage 32 within recess 34. In such an implementation, frame layer 24 comprises a thin sheet or panel of material having a top face and a bottom face, wherein recess 34 comprises an opening extending completely through frame layer 24 from the top face to the bottom face. In one implementation, recess 34 may be formed by performing a material removal process on the sheet or panel forming frame layer 24. In one implementation, recess 34 may be formed by through hole punching the sheet of material forming frame layer 24.

As will also be described in detail hereafter, in other implementations, substrate 28 is mounted to frame layer 24 inside of recess 34. For example, in one implementation, frame layer 24 may be 3-D printed, molded or physically deformed and pressed to form recess 34, wherein recess 34 comprises a concavity having sidewalls and a floor. In such an implementation, substrate 24 is mounted upon the floor of the concavity formed by the pressed sheet or panel of frame layer 24.

SEL stage 32 comprises a surface enhanced luminescence analyte stage upon which analyte is deposited for testing. For purposes of this disclosure, a surface enhanced luminescence (SEL) analyte stage is any structure or particle that interacts with the deposited analyte so as to enhance the intensity of the radiation scattered or reemitted by the analyte. Stage 32 enhances the amount of radiation or the number of photons that are scattered or re-emitted by the analyte upon being impinged by radiation from a radiation source.

In one implementation, stage 32 comprises an SEL structure or a group of SEL structures supported by substrate 28 upon which and about which an analyte contacts. In one implementation, the SEL structures comprise enhanced fluorescence spectroscopy structures or enhanced luminescence spectroscopy structures. In one implementation, the SEL structures comprise surface enhanced Raman spectroscopy (SERS) structures. Such structures may include a metal surface or structure, wherein interactions between the analyte and the metal surface cause an increase in the intensity of the Raman-scattered radiation. Such metal surfaces may include a roughened metal surface or metal islands. In one implementation, such metal islands comprise columnar supports such as pillars, needles, fingers, particles or wires. In some implementations, the columnar structures may include a metal cap or head upon which analyte may be deposited. In some implementations, such columnar structures are formed from materials and/or are dimensioned so as to bend or flex towards and away from one another in response to applied electric fields. In some implementations, the SEL structures are movable and are self-actuating, wherein such columnar structures bend or flex towards one another in response to micro-capillary forces so as to self-organize, wherein such bending facilitates close spacing between the structures for greater scattered radiation intensity.

In one implementation, the SEL or SER structures have a nanometer scale to facilitate nano-enhanced Raman spectroscopy (NERS). Such nano-scale NERS structures may increase the intensity of radiation scattered by the analyte adsorbed on such structures by a factor as high as $10^{16}$. In other implementations, stage 32 may comprise SEL particles. Examples of SEL particles include, but are not limited to, electrodes in electrolytic cells and metal colloid solutions.

Figure 2:
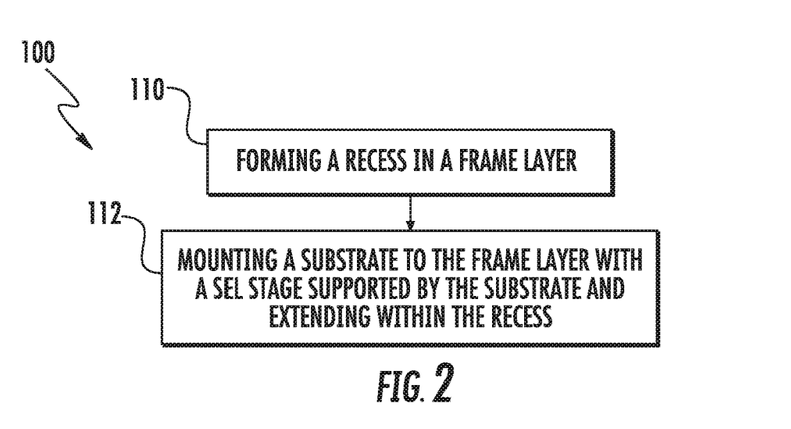
FIG. 2 is a flow diagram of an example method for forming an example SEL stage package.
Figure 3:
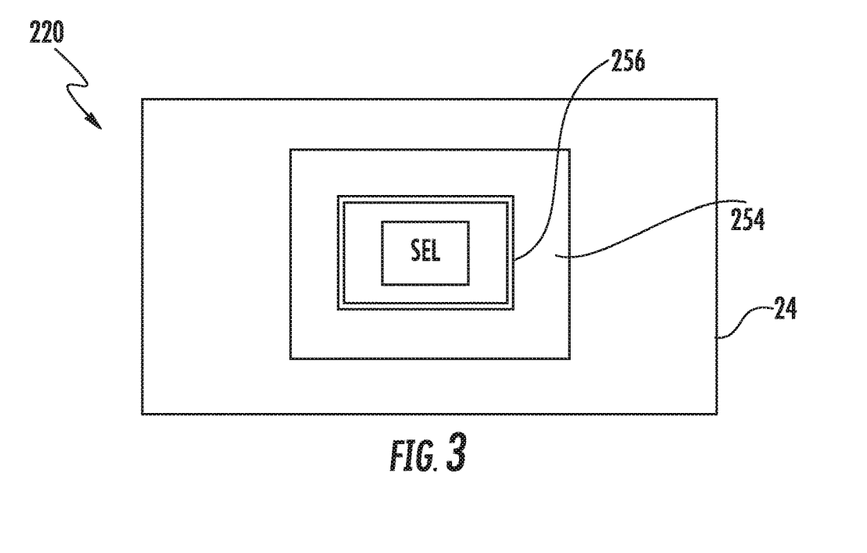
FIG. 3 is a top view schematically illustrating an example SEL stage package.

FIG. 2 is a flow diagram of an example method 100 for forming a SEL stage package. Method 100 facilitates the fabrication of a SEL stage package with less complexity and less cost. Although method 100 is described in the context of forming SEL stage package 20, it should be understood that method 100 may be utilized to form any of the SEL stage packages described hereafter.

As indicated by block 110, a recess, such as recess 34 is formed in a frame layer (such as frame layer 24). In one implementation, frame layer 24 comprises a sheet or panel, wherein recess 34 is formed by cutting or removing material from the sheet or panel to form an opening that completely extends through the sheet are panel and that provides recess 34. For example, in one implementation, frame layer 24 may be formed by through hole punching an opening through the sheet or panel forming frame layer 24. In another implementation, recess 34 may be formed by deforming or pressing (also known as stamping) the sheet or panel of material forming frame layer 24 so as to form a concavity having sides and a floor. In yet other implementations, frame layer 24 may be formed using a molding process or using a three-dimensional printing process which provides a layer with a through opening or a floored concavity providing recess 34.

As indicated by block 112, a substrate (such a substrate 28) is secured within the recess 34. The substrate supports a SEL stage. The substrate is mounted within the recess such that the SEL stage extends within the recess. In one implementation, the SEL stage is preformed on the substrate prior to the substrate being mounted to the recess, wherein the substrate, with the SEL stage, is mounted to the frame layer within the recess. In implementations where the formed recess comprise a through opening or through hole, the substrate is mounted to a face of the frame layer 24, spanning across at least one dimension of recess 34 and supporting SEL stage which rises from the substrate into the recess. In implementations where the formed recess comprises a floored concavity, the substrate is mounted to the floor of the cavity inside the recess with the supported SEL stage also contained within the concavity.

Figure 4:
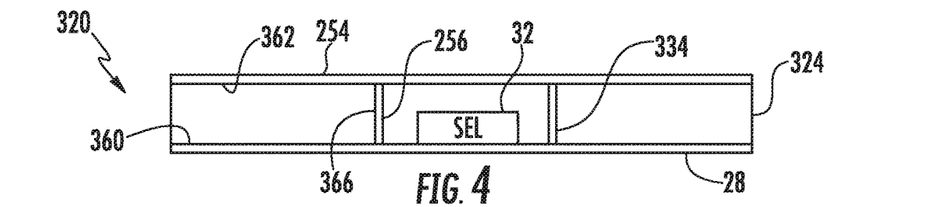
FIG. 4 is a sectional view of an example SEL stage package.

FIG. 4 is a top view schematically illustrating an example SEL stage package 220. Package 220 is similar to package 20 described above except that package 220 additionally comprises sealing layer 254 and lining 256. Those remaining components of package 220 which correspond to components of package 20 are numbered similarly.

Sealing layer 254 (schematically illustrated with transparent hatching) comprises a layer of a material or multiple materials that is secured to a face of frame layer 24, above and about recess 34, wherein layer 254 spans across and covers the entire mouth of recess 34. In one implementation, sealing layer 254 is imperforate and forms an air seal over recess 34, inhibiting the ingress of air, contaminants or other particles into the recess 34 and onto stage 32. In some implementations, recess 34 may be vacuum sealed with layer 254 to inhibit oxidation of particular metals that may be utilized as part of stage 32, such as silver. In one implementation, layer 254 comprises a thin metal-coated polymeric film, such as a thin film of aluminum coated PTFE having a thickness of at least 25 um and no greater than 500 um. In other implementations, layer 254 may be formed from other materials and may have other dimensions.

Lining 256 comprise a layer of material or materials formed upon the interior surfaces of recess 34. Lining 256 comprises a material that inhibits the leaking or egress of contaminants from the material forming lead frame 24. For example, in one implementation, lining 256 comprises a layer of gold providing the interior surface of recess 34 with an internal gold surface about the recess. In implementations in which recess 34 comprises a through opening, Lining 256 lines, covers or coats the interior sides of the through opening. In implementations where recess 34 comprises a floored concavity, lining 256 lines, covers or coats the interior sides and the floor of the concavity.

Figure 5:
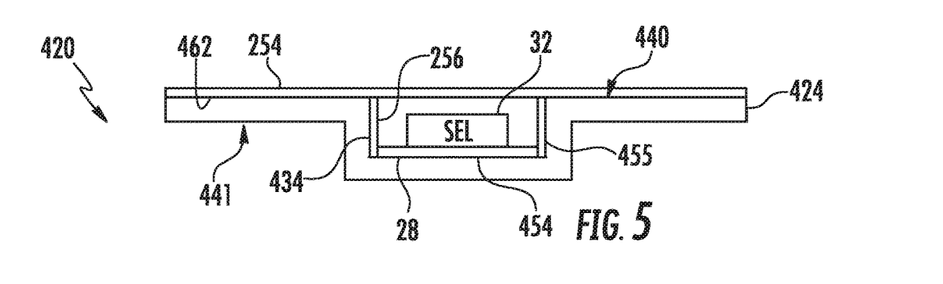
FIG. 5 is a sectional view of an example SEL stage package.

FIGS. 4 and 5 are sectional views illustrating two variations of SEL stage package 220. FIG. 4 illustrates SEL stage package 320. As shown by FIG. 4, SEL stage package 320 comprises a frame layer 324 having a recess 334 that comprises a through opening extending completely through the layer of material or materials of frame layer 324. In the illustrated example, substrate 28 is secured to the lower face 360 of frame layer 324 with SEL stage 32 rising from substrate 28 into the through opening of recess 334. Substrate 28 completely extends across and beyond the perimeter of recess 334 along the lower face 360 of frame layer 324. In one implementation, substrate 28 may be secured to lower face 360 by an adhesive. In other implementations, substrate 28 may be secured to lower face 360 by welds, fasteners or other securement methods.

As further shown by FIG. 4, contamination of SEL stage 32 within recess 334 is inhibited by sealing layer 254 and lining 256 (described above). Sealing layer 254 is secured to upper face 362 of frame layer 324 and spans recess 334 so as to completely cover the mouth of recess 334. In the example illustrated, sealing layer 254 is secured to frame layer 324 by an adhesive, such as a pressure sensitive adhesive, that allows sealing layer 254 to be peeled away from frame layer 324 when SEL stage package 320 is to be used. In other implementations, sealing layer 254 has a thickness or is formed from materials so as to be punctured or perforated to access the interior chamber formed by frame layer 324 with lining 256, substrate 28 and sealing layer 254 that contains stage 32.

Lining 256 lines, covers or coats the interior sides 366 of recess 328. Lining 256 comprises a material that inhibits the leaking or egress of contaminants from the material forming lead frame 324. For example, in one implementation, lining 256 comprises a layer of gold providing the interior surface of recess 334 with an internal gold surface about the recess 334.

FIG. 5 illustrates SEL stage package 420. As shown by FIG. 5, SEL stage package 420 comprises a frame layer 424 having a recess 434 that comprises a floored concavity. In one implementation, frame layer 424 comprises a panel or sheet that is pressed or deformed so as to form the floored concavity, wherein the thickness of the sheet on either side of the floored concavity and underline the floored cavity remain substantially the same but for slight thinning in regions where the sheet or panel of material has been deformed. Frame layer 424 has a first face 440 which forms floor 454 and surface 462 and a second opposite face 441. Face 440 has a first profile while face 441 has a second profile that mirrors the profile of face 440. In the illustrated example, substrate 28 is secured, directly or indirectly, to the floor 454 of frame layer 24 with SEL stage 32 contained within recess 434. Substrate 28 is contained entirely within recess 434. In one implementation, substrate 28 may be secured to floor 454 by an adhesive. In other implementations, substrate 28 may be secured to floor 454 by welds, fasteners or other securement methods.

As further shown by FIG. 5, contamination of SEL stage 32 within recess 434 is inhibited by sealing layer 254 and lining 256 (described above). Sealing layer 254 is secured to surface 462 of frame layer 24 and spans recess 434 so as to completely cover the mouth of recess 434. In the example illustrated, sealing layer 254 is secured to frame layer 424 by an adhesive, such as a pressure sensitive adhesive, that allows sealing layer 254 to be peeled away from frame layer 424 when SEL stage package 420 is to be used. In other implementations, sealing layer 254 has a thickness or is formed from materials so as to be punctured or perforated to access the interior chamber formed by frame layer 424 with lining 256, substrate 28 and sealing layer 254 that contains stage 32.

Lining 256 lines, covers or coats the interior sides 455 of recess 434. In such an implementation, lining 256 comprises a material that inhibits the leaking or egress of contaminants from the material forming frame layer 424. For example, in one implementation, lining 256 comprises a layer of gold providing the interior surface of recess 434 with an internal gold surface about the recess.

Figure 6:
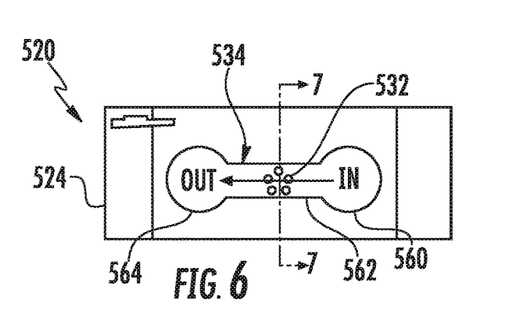
FIG. 6 is a top view of an example SEL stage package.
Figure 7:
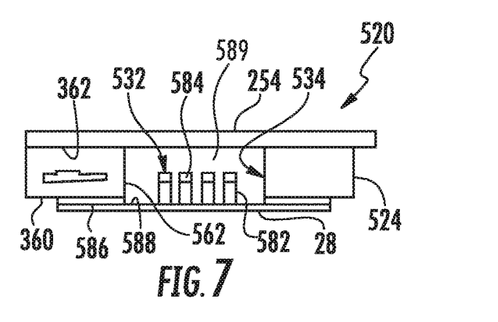
FIG. 7 is a sectional view of the example SEL stage package of FIG. 6 take along line 7-7.

FIGS. 6 and 7 illustrate an example SEL stage package 520. Package 520 is similar to package 320 except that package 520 comprises frame layer 524 and SEL stage 532, specific examples of frame layer 324 and stage 32. Those remaining components or elements of package 320 which correspond to components or elements of package 220 are numbered similarly.

Frame layer 524 is similar to frame layer 324 except that frame layer 524 comprises recess 534. In the example illustrated, recess 534 comprises a through opening extending completely through frame layer 524. Recess 534 comprises input port 560, flow channel 562 and output port 564. Input port 560 forms a basin or well that receives a sample solution. Flow channel 562 receives stage 532 and facilitates flow of the solution being tested to stage 532. Output port 564 receives fluid that is passed across stage 532. In one implementation, the formation of recess 534 occurs prior to the mounting of substrate 28 and stage 532 within recess 534 and prior to the sealing of recess 534 by sealing layer 254.

SEL stage 532 comprises surface enhanced Raman spectroscopy (SEL) structures. In the example illustrated, stage 532 comprises pillars, needles, fingers, nano rods or wires. In some implementations, the columnar structures may include a metal cap or head upon which analyte may be deposited. In some implementations, such columnar structures are formed from materials and/or are dimensioned so as to bend or flex towards and away from one another in response to applied electric fields. In some implementations, the SEL structures are movable and are self-actuating, wherein such columnar structures bend or flex towards one another in response to micro-capillary forces so as to self-organize, wherein such bending facilitates close spacing between the structures for greater scattered radiation intensity.

In one implementation, the SEL or SER structures have a nanometer scale to facilitate nano-enhanced Raman spectroscopy (NERS). Such nano-scale NERS structures may increase the intensity of radiation scattered by the analyte adsorbed on such structures by a factor as high as $10^{16}$. In other implementations, stage 532 may comprise other SERS or other SEL structures.

SEL stage 532 is supported by substrate 28 within flow channel 562 of recess 534. In the example illustrated, stage 532 comprises a cluster of five individual nano rods 582, wherein the individual nano rods 582 bend in directions towards one another to enhance Raman spectroscopy plasmonic response. Each of the individual nano fingers 582 has a metallic tip 584, such as a metallic tip of gold, silver or the like, to further enhance Raman spectroscopy plasmonic response. In yet other implementations, stage 532 may comprise a greater or fewer of such individual nano fingers 482 arranged in a cluster, multiple clusters, a single grid or other arrangements. In other implementations, nano fingers 582 may have other configurations or may omit tips 584.

In one implementation, each nano finger 582 has a height or length rejecting from substrate 28 of at least 0.05 um and no greater than 50 um. In one implementation, each of nano fingers 582 are spaced from one another by at least 0.2 um and no greater than 10 um. In one implementation, nano fingers 582 of stage 532 are formed by imprinting a layer of material, such as an epoxy based photoresist, such as SU8 (a Bisphenol A Novolac epoxy that is dissolved in an organic solvent), supported by substrate 428, wherein metal tips are subsequently formed on the ends of the nano fingers.

As shown by FIG. 7, substrate 28 is secured to face 360 of frame layer 524 by adhesive 586. Nano rods 582 rise from substrate 28 into recess 534. In such an implementation, substrate 28 additionally forms a floor 588 for forming a cavity or chamber 589 for receiving solution being tested using stage 532.

Figure 8A:
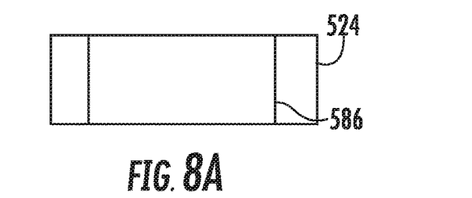
FIG. 8A is a top view illustrating an example application of adhesive to a sheet which is to form an example frame layer of an example SEL stage package.
Figure 8B:
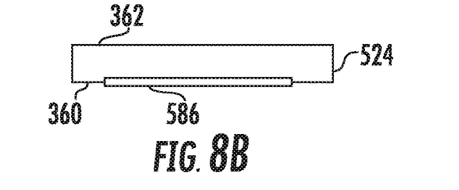
FIG. 8B is a sectional view of the sheet and adhesive of FIG. 8A.

FIGS. 8A-11B illustrate one example method of forming package 520. As shown by FIGS. 8A and 8B, frame layer 524 starts out as a single block, sheet or layer of material having lower face 360 and upper face 362. In the example illustrated, adhesive 586 is applied to lower face 360. Adhesive 586 facilitate securement of substrate 28 and stage 532 to lower face 360. In other implementations, the application of adhesive 586 may be omitted where other mechanisms are employed for securing stage 532 to frame layer 524.

Figure 9A:
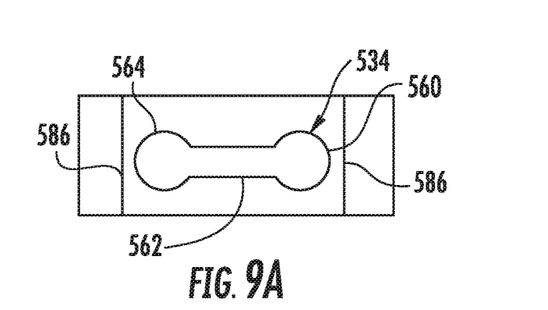
FIG. 9A is a top view illustrating the forming of an example recess in the sheet of FIG. 8A to form an example frame layer.
Figure 9B:
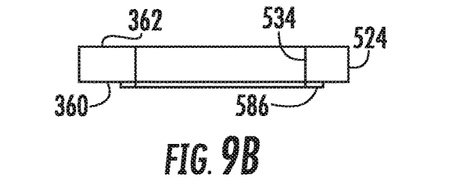
FIG. 9B is a sectional view of the example frame layer of FIG. 9A.

FIGS. 9A and 9B illustrate the forming of recess 534 in frame layer 524. In one implementation, frame layer 524 shown in FIGS. 8A and 8B is cut or severed, such as through hole punching, to form the through opening of recess 534. In another implementation, other material removal techniques may be utilized to remove portions of frame layer 524 and adhesive to form recess 534. In some implementations, in lieu of applying adhesive 586 prior to the forming of recess 534, adhesive 586 may be applied to frame layer 524 after the forming of recess 534.

Figure 10A:
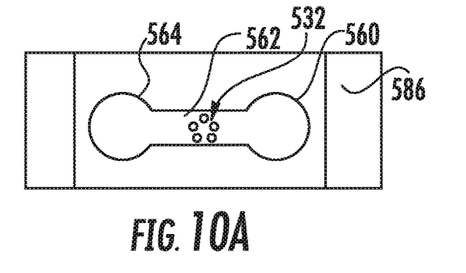
FIG. 10A is a top view illustrating securement of an example SEL stage module to the example frame layer of FIG. 9A.
Figure 10B:
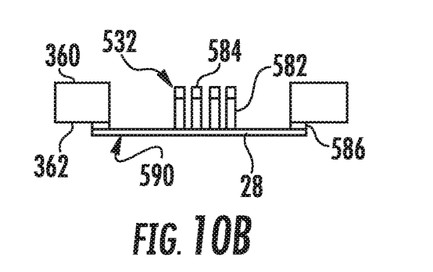
FIG. 10B is a sectional view illustrating the securement of the example SEL stage module to the example frame layer.

FIGS. 10A and 10B illustrate the mounting of substrate 28 and the substrate supported SEL stage 532 to face 362 of frame layer 524 using adhesive 586. In the example illustrated, substrate 28 and SEL stage 532 are secured to one another prior to their attachment to frame layer 524. In the example illustrated, substrate 28 and SEL stage 532 are preformed as a stage module 590. Module 590 comprises a package or unit of interconnected components that it itself may be then mounted to frame layer 524 as part of the process for assembling package 520. In the example illustrated, module 590 comprises substrate 28 and stage 532.

Figure 11A:
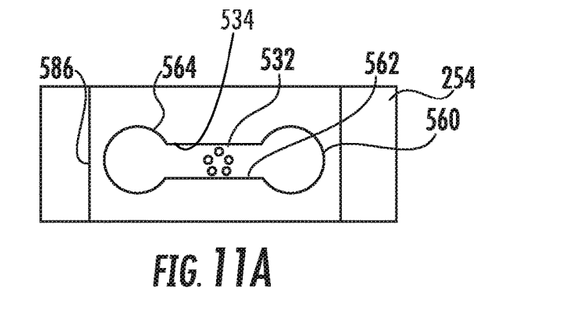
FIG. 11A is a top view illustrating securement of an example ceiling layer to the example frame layer of FIG. 10A.
Figure 11B:
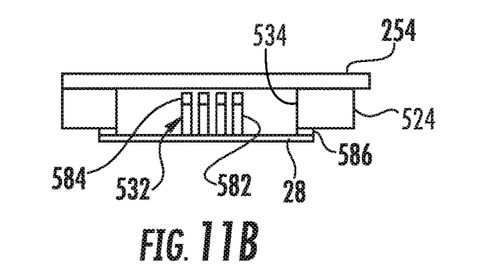

As shown by FIGS. 11A and 11B, sealing layer 254, which completely covers recess 534, is secured to face 360 over recess 534 and over module 590. In one implementation, sealing layer 254 comprises a tape that is peelable or removable from sidewalls of frame layer 524. In another implementation, sealing layer 254 is puncturable or tearable, allowing the solution or liquid being tested to be injected or deposited into recess 534.

As pointed out above, the above described frame layers facilitate fabrication of (A) the frame layers 24, 324, 424, 524 and (B) the module 590 (providing substrate 28 and stage 32, 532) independent and separate from one another. As a result, such independently formed components may be fabricated with less complexity and less cost. Such independently formed components may be fabricated using large volume or mass production techniques wherein multiples of the individual components are formed together and are subsequently separated.

Figure 12:
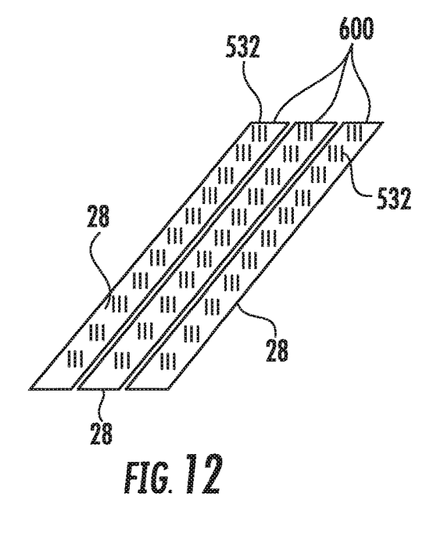
FIG. 12 is a top perspective view of example strips of SEL stages.
Figure 13:
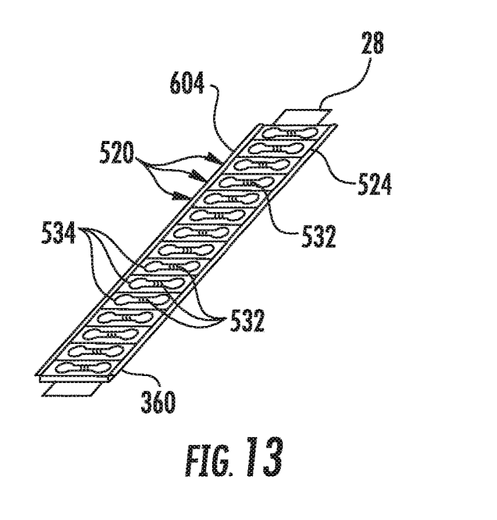
FIG. 13 is a top perspective view illustrating securement of a strip of SEL stages to a strip of corresponding example frame layers.

FIGS. 12 and 13 illustrate one example method for forming a plurality of SEL stage packages, such as SEL stage package 520 described above. As shown by FIG. 12, a single sheet of material may serve as a platform upon which stages 532 are formed. In one implementation, a single sheet of material comprises a sheet of a polymer plastic, wherein the sheet is coated with a material, such as an epoxy-based resin that is imprinted to form multiple spaced stages 532. In one implementation, the sheet is sufficiently flexible, wherein the imprinting of the sheet with stages 532 is formed as part of a roll to roll process. In one implementation, the imprinted and spaced stages 532 are arranged in rows. As further shown by FIG. 12, the different rows of multiple spaced stages are separated by cutting the sheet into strips 600. Each strip 600 provides stages 532 for multiple individual packages 520.

As shown by FIG. 13, an elongate strip 604 is stamped or photo etched to form multiple recesses 534. The recesses 534 are arranged in a row and have spacings corresponding to the spacings of the stages 532 of strip 600. As illustrated in FIGS. 7A-8B, the lower surface of the strip 604 may be coated with an adhesive layer before or after the forming of recesses 534.

As further shown by FIG. 13, one of the strips 600 is laminated using the adhesive layer 586, to the lower face 360 of strip 604 with each of the individual stages 532 projecting into and received by a corresponding one of recesses 534. Thereafter, the pair of strips 600, 604 may serve as a SEL multi-stage package. Alternatively, the laminated pair of strips 600, 606 may be further separated into smaller groupings of multiple SEL stage packages or into individual SEL stage packages.

In some implementations, a strip or tape may be adhered to and on top of strip 604 prior to separation of strip 600, 604 into the individual packages 520. In some implementations, individual pieces the tape may alternatively be secured over individual recesses 534 after strips 600, 604 are severed into individual or groups of individual packages 520.

Figure 14:
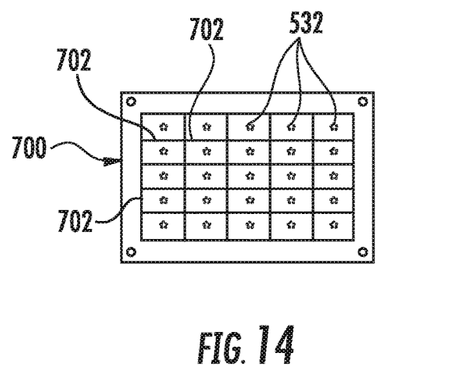
FIG. 14 is a top view of an example panel of example SEL stages.
Figure 15:
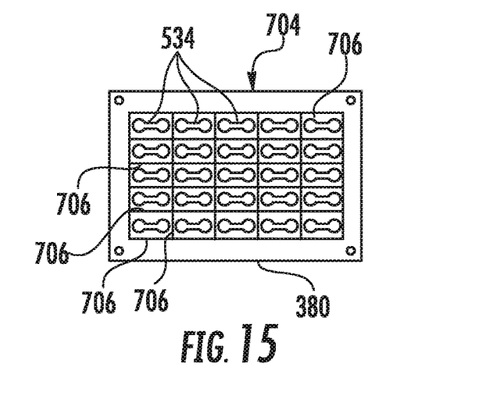
FIG. 15 is a top view of an example panel of example frame layers.
Figure 16:
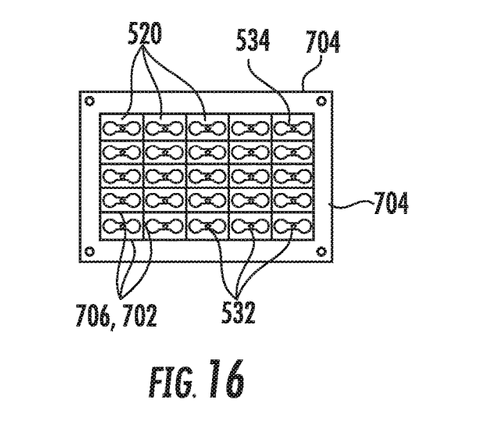
FIG. 16 is a top view illustrating securement of the panel of example frame layers of FIG. 15 to the panel of example SEL stages of FIG. 14.

FIGS. 14-16 illustrate another example method for forming a plurality of SEL stage packages, such as SEL stage package 520 described above. As shown by FIG. 14, a grid or two dimensional array of individual SEL stages 532 is formed upon a sheet 700. In one implementation, the single sheet 700 of material comprises a sheet of a polymer plastic, wherein the sheet is coated with a material, such as an epoxy-based resin that is imprinted to form multiple spaced stages 532. In one implementation, the sheet is sufficiently flexible, wherein the imprinting of the sheet with stages 532 is formed as part of a roll to roll process. In one implementation, the individual stages 532 are separated by perforations 702 to facilitate subsequent separation.

As illustrated by FIG. 14, a grid or two dimensional array of recesses 534 may be formed in a second sheet 704. The two dimensional array of recesses 534 have spacings and locations corresponding to the two dimensional array of stages 532 on sheet 700. As illustrated in FIGS. 8A-9B, the lower surface of the sheet 704 may be coated with an adhesive layer before or after the forming of recesses 534. In one implementation, each of the individual stages 532 on sheet 700 are separated by perforation lines 706 which correspond to perforation lines 702 on sheet 700.

As illustrated by FIG. 16, sheet 704 is placed on top of sheet 700 with each of stages 532 projecting into a corresponding one of recesses 534. The sheet 700, which forms substrates 28, is bonded to face 360 of sheet 704 by the adhesive 586 (shown in FIG. 9B). Thereafter, the individual SEL stage packages are separated. In the example illustrated, the individual SEL stage packages are separated along the perforation lines 702, 706. In other implementations, such perforation line 702 and/or 706 may be omitted, wherein the individual SEL stage packages or groupings of multiple SEL stage packages are separated from one another such as through laser cutting or other severing techniques.

In some implementations, a sheet, with or without perforations corresponding to perforation 702, 706, providing sealing layers 254 may be laminated to and on top of sheet 704. In some implementations, individual pieces the tape may alternatively be secured over individual recesses 534 after sheets 700, 704 are severed into individual or groups of individual packages 520.

Figure 17:
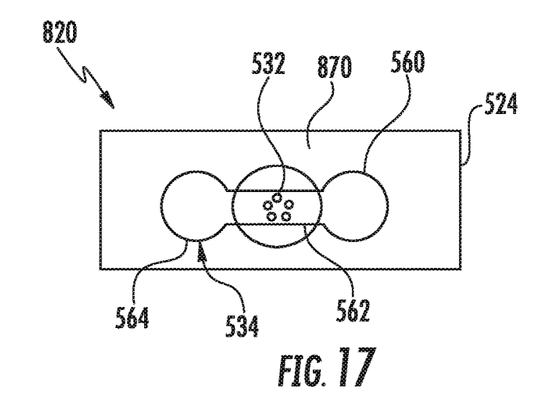
FIG. 17 is a top view of an example SEL stage package.
Figure 18:
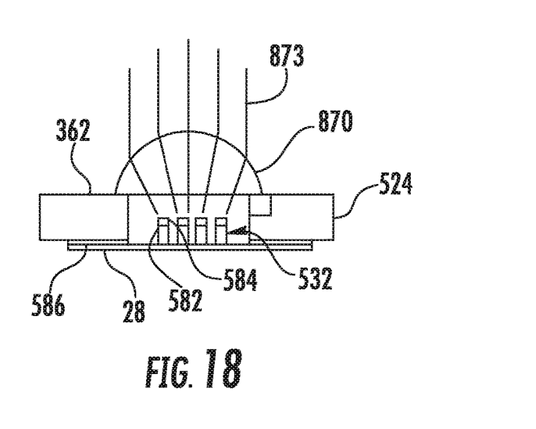
FIG. 18 is a sectional view the example SEL stage package of FIG. 17.

FIGS. 17 and 18 illustrate an example SEL stage package 820. Package 820 is similar to package 520 except that package 820 comprises focusing lens 870 in place of sealing layer 254. Those remaining components of package 820 which correspond to components of package 520 are numbered similarly.

Focusing lens 870 comprises a transparent material arranged opposite to stage 532 so as to focus or concentrate light rays 873 from an illumination source, such as a laser, onto stage 532. In the example illustrated, lens 870 is secured to face 362 of frame layer 524, spanning across recess 534. In the example illustrated, lens 470 comprises a convex. In other implementations, lens 470 may comprise other types of lenses having other focusing characteristics. In some implementations, package 820 may be formed using either of the example processes described above with respect to FIGS. 12-13 or FIG. 14-16.

Figure 19:
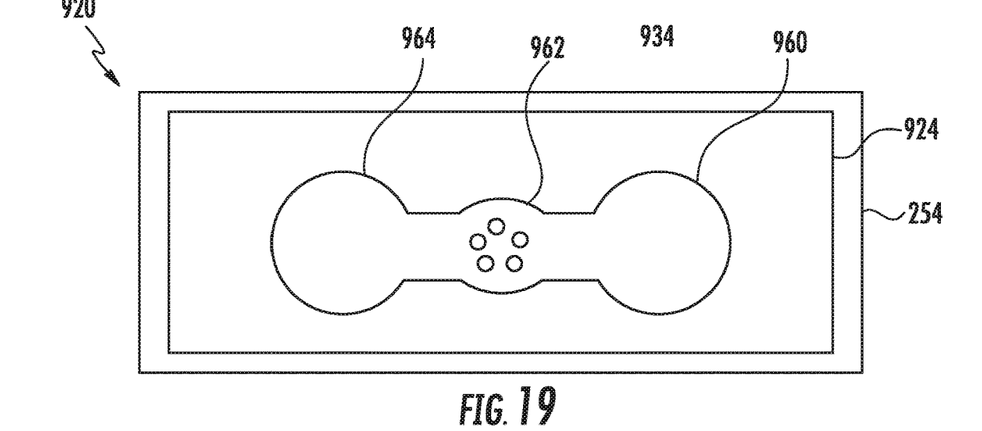
FIG. 19 is a top view of an example SEL stage package.
Figure 20:
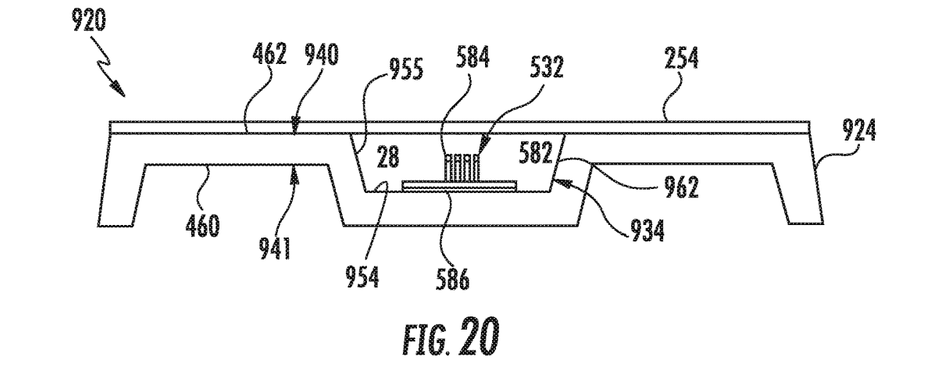
FIG. 20 is a sectional view of the example SEL stage package.

FIGS. 19 and 20 illustrate an example SEL stage package 920. Package 920 is similar to package 420 except that package 520 comprises frame layer 924 and SEL stage 532, specific examples of frame layer 324 and stage 32. Those remaining components or elements of package 920 which correspond to components or elements of package 420 are numbered similarly.

Frame layer 924 is similar to frame layer 424 except that frame layer 924 comprises recess 934. Recess 934 is similar to recess 434 in that recess 934 comprises a floored concavity formed by deformation and pressing of frame layer 924. As shown by FIG. 20, the thickness of the sheet forming frame layer 924 on either side of the floored concavity and underlying the floored cavity remain substantially the same but for slight thinning in regions where the sheet or panel of material has been deformed. Frame layer 924 has a first face 940 which forms floor 954 and surface 462 and a second opposite face 941. Face 940 has a first profile while face 941 has a second profile that mirrors the profile of face 940.

As shown by FIG. 19, recess 934 comprises input port 960, flow channel 962 and output port 964. Input port 960 forms a basin or well that receives a sample solution. Flow channel 962 receives stage 532 and facilitates flow of the solution being tested to stage 532. Output port 964 receives fluid that is passed across stage 532. In one implementation, the formation of recess 934 occurs prior to the mounting of substrate 28 and stage 532 within recess 934 and prior to the sealing of recess 934 by sealing layer 254.

As shown by FIG. 20, substrate 28 is secured to floor 954 of recess 934 by adhesive 586. Nano rods 582 rise from substrate 28 within recess 934. In the example illustrated, neither floor 954 nor sides 955 of recess 934 are coated with a lining, such as lining 256. In other implementations, floor 954 and flash or sides 955 may be additionally coated with a lining, such as lining 256 described above. In the example illustrated, sides 955 are angled or ramped, providing a convex angle facing surface 462 to facilitate pressing of the sheet to form recess 934 and the release of the pressed or deformed sheet. In other implementations, sides 955 may extend from floor 954 at other angles.

Figure 21:
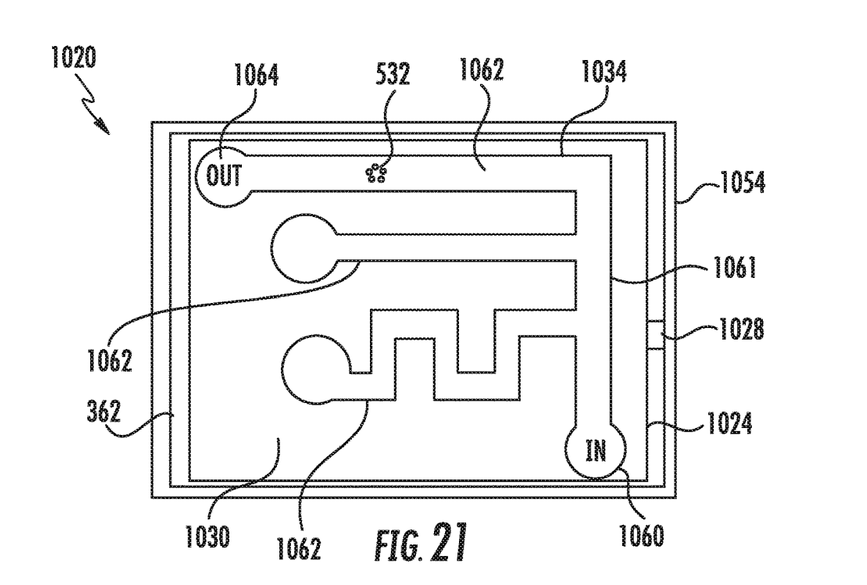
FIG. 21 is a top view of an example SEL stage package.

FIG. 21 illustrates an example SEL stage package 1020. Package 1020 comprises frame layer 1024, substrate 1028, SEL stage 532, capping layer 1030 and sealing layer 1054. Frame layer 1024 is similar to frame layer 24 described above except that frame layer 1024 comprises the recess 1034, a specific example of recess 34. Recess 1034 comprises a multitude of interconnected recess segments formed in frame layer 1024. In the example illustrated, recess 1034 forms an input port 1060, a primary flow channel segment 1061, a plurality of parallel branch flow channel segments 1062 and an outlet port 1064. FIG. 21 illustrates just one example layout of channels or segments of recess 1034. In other implementations, recess 1034 may include a greater or fewer of such flow channels and ports and may include channels or ports having other shapes, dimensions and proportions. Such flow channels may direct flow to different filtering, mixing or sensing stations along frame layer 1024. In some implementations, recess 1034 may additionally include a lining, such as lining 256, that covers the sides and/or floor of recess 1034.

In one implementation, recess 1034 comprises a through opening extending completely through the sheet or panel forming frame layer 1024. In such an implementation, substrate 1028 covers one side of recess 1034, providing a floor for the flow channels and ports. For example, in one implementation, substrate 1028 is laminated to a first face of frame layer 1024, forming a floor along the first face of frame layer 1024.

In another implementation, frame layer 1024 comprises a pressed and deformed sheet of material, wherein recess 1034 comprises floored concavities in the face of frame layer 1024. In such an implementation, substrate 1028 may be smaller, secured onto the floor in a portion of the larger recess 1034 while supporting stage 532 in the recess 1034. In such an implementation, the thickness of the sheet forming frame layer 1024 is substantially uniform throughout package 1020 but for slight thinning in regions where the sheet or panel of material has been deformed. In such an implementation, the opposite faces of the sheet forming frame layer 1024 have profiles that mirror one another. In other words, where one face may have a particular convex shape, the other face may have a corresponding concave shape.

Capping layer 1030 comprises a panel, sheet or layer of material adhered to a second face 362, a face opposite to the first face, of frame layer 1024. Capping layer 1030 provides a top or lid over those portions of recess 1034 in which fluid is to be contained as it flows along such portions of recess 1034. In the example illustrated, inlet port 1060 and outlet port 1064 are not covered by capping layer 1030. In one implementation, the entirety of capping layer 1030 is transparent. In another implementation, at least portions of capping layer 1030 opposite to stage 532 are transparent to impinging of facilitate stage 532 and any analyte on stage 532 from an illumination source, such as a laser. In some implementations, capping layer 1030 may be omitted.

Sealing layer 1054 is substantially similar to sealing layer 254 described above. Sealing layer 1054 comprises a layer of a material or multiple materials that is secured to a face of frame layer 1024 (or over into capping layer 1030 where provided), wherein layer 1054 spans across and covers the inlet port 1060 and outlet port 1064 of recess 1034. In one implementation, sealing layer 1054 is imperforate and forms an air seal over recess 1034, inhibiting the ingress of air, contaminants or other particles into the recess 1034 and onto stage 532. In some implementations, recess 1034 may be vacuum sealed to inhibit oxidation of particular metals that may be utilized as part of stage 532, such as silver. In one implementation, layer 1054 comprises a thin polymeric film, such as a thin film or tape of aluminum coated polytetraflouroethylene (PTFE) film having a thickness of at least 25 um and no greater than 500 um. In other implementations, layer 1054 may be formed from other materials and may have other dimensions. In yet other implementations, sealing layer 1054 may be omitted.

Although the present disclosure has been described with reference to example implementations, workers skilled in the art will recognize that changes may be made in form and detail without departing from the spirit and scope of the claimed subject matter. For example, although different example implementations may have been described as including one or more features providing one or more benefits, it is contemplated that the described features may be interchanged with one another or alternatively be combined with one another in the described example implementations or in other alternative implementations. Because the technology of the present disclosure is relatively complex, not all changes in the technology are foreseeable. The present disclosure described with reference to the example implementations and set forth in the following claims is manifestly intended to be as broad as possible. For example, unless specifically otherwise noted, the claims reciting a single particular element also encompass a plurality of such particular elements. The terms "first", "second", "third" and so on in the claims merely distinguish different elements and, unless otherwise stated, are not to be specifically associated with a particular order or particular numbering of elements in the disclosure.

What is claimed is:

1. An apparatus comprising:
a frame layer having a recess;
a substrate secured to the frame layer at least partially across the recess;
a surface enhanced luminescence (SEL) stage supported by the substrate within the recess, wherein the frame layer comprises a pressed sheet deformed such that the frame layer comprises:
a first surface having a first profile having a floor portion, vertical sidewalls projecting upwardly from the floor portion and an upper portion extending from the vertical sidewalls to form the recess, wherein the substrate is secured over the floor portion; and
a second opposite surface having a second profile mirroring the first profile, the second profile comprising a first surface portion opposite and parallel to the floor portion, a second surface portion opposite and parallel to the vertical sidewalls and a third surface portion opposite and parallel to the upper portion.

2. The apparatus of claim 1, wherein the frame layer comprises an internal gold surface about the recess.

3. The apparatus of claim 1, wherein the recess comprises an inlet having a first cross-sectional area, an outlet having a second cross-sectional area and a channel extending from the inlet to the outlet, the channel having a third cross-sectional area less than the first cross-sectional area and the second cross-sectional area, the channel receiving the SEL stage.

4. The apparatus of claim 1, wherein the SEL stage comprises a surface enhanced Raman spectroscopy stage.

5. A method comprising:
forming a recess in a frame layer;
mounting a substrate to the frame layer with a first surface enhanced luminescence (SEL) stage supported by the substrate and extending within the recess;
forming a second recess in the frame layer;
mounting the substrate to the frame layer with a second SEL stage supported by the substrate and extending within the second recess; and
severing the frame layer with the mounted substrate to form a first SEL stage package comprising the first SEL stage and a second SEL stage package comprising the second SEL stage.

6. The method of claim 5 further comprising imprinting a polymeric strip to form the substrate and the SEL stage.

7. The method of claim 5 comprising forming an opening completely through the frame layer, the opening providing the recess.

8. The method of claim 5 comprising pressing the frame layer such that a top surface of the frame layer extends in a plurality of parallel planes to form a floored concavity providing the recess and a bottom surface of the frame layer extends in a plurality of parallel planes.

9. The method of claim 5 further comprising securing a lens to the frame layer over the recess.

10. The apparatus of claim 1, wherein the frame layer has thickness between the floor portion and the first surface portion, has the thickness between the vertical sidewalls and the second surface portion and has the thickness between the upper portion and the third surface portion.

11. The apparatus of claim 1 further comprising:
a capping layer to the frame layer over the recess, the capping layer having an inlet opening and an outlet opening opposite the recess; and
a sealing layer over the capping layer and over the inlet opening and the outlet opening of the capping layer.

12. The apparatus of claim 1, wherein interior sides of the recess of the frame layer are coated with a lining.

13. The method of claim 5, wherein the SEL first stage is affixed to and supported by the substrate prior to mounting of the substrate to the frame layer and wherein the first SEL stage is aligned with the recess to project from the substrate, beyond a junction of the substrate and the frame layer and vertically into the recess, following mounting of the substrate to the frame layer.

14. The method of claim 5, wherein the frame layer comprises a first surface, a second surface, wherein the recess extends from the first surface to the second surface and wherein the recess comprises an inlet having a first cross-sectional area, an outlet having a second cross-sectional area and a channel extending from the inlet to the outlet, the channel having a third cross-sectional area less than the first cross-sectional area and the second cross-sectional area, the channel receiving the first SEL stage.

15. The method of claim 5, wherein the SEL first stage and the second SEL stage each comprises a set of nano rods.

16. The method of claim 5 further comprising unwinding the substrate from a roll.

* * * * *